United States Patent
Patel et al.

[11] Patent Number: 5,977,210
[45] Date of Patent: Nov. 2, 1999

[54] MODIFIED EMULSION AGGREGATION PROCESSES

[75] Inventors: Raj D. Patel, Oakville; Marcel P. Breton, Mississauga; Michael A. Hopper, Toronto; Grazyna E. Kmiecik-Lawrynowicz, Burlington; Beng S. Ong, Mississauga, all of Canada

[73] Assignee: Xerox Corporation, Stamford, Conn.

[21] Appl. No.: 08/380,550

[22] Filed: Jan. 30, 1995

[51] Int. Cl.⁶ .................................................... C08F 2/26
[52] U.S. Cl. ........................ 523/161; 524/458; 524/495; 524/496; 430/137
[58] Field of Search ............................. 523/161; 524/458; 524/495, 496; 430/137

[56] References Cited

U.S. PATENT DOCUMENTS

| | | | |
|---|---|---|---|
| 4,601,777 | 7/1986 | Hawking et al. | 216/27 |
| 4,797,339 | 1/1989 | Maruyama et al. | 430/109 |
| 4,983,488 | 1/1991 | Tan et al. | 430/137 |
| 4,996,127 | 2/1991 | Hasegawa et al. | 430/109 |
| 5,100,955 | 3/1992 | Pons et al. | 524/832 |
| 5,278,020 | 1/1994 | Grushkin et al. | 430/137 |
| 5,290,654 | 3/1994 | Sacripante et al. | 430/137 |
| 5,308,734 | 5/1994 | Sacripante et al. | 430/137 |
| 5,344,738 | 9/1994 | Kmiecik Lawrynowicz et al. | 430/137 |
| 5,346,797 | 9/1994 | Kmiecik Lawrynowicz et al. | 430/137 |
| 5,364,729 | 11/1994 | Kmiecik-Lawrynowicz et al. | 430/137 |
| 5,366,841 | 11/1994 | Patel et al. | 430/137 |
| 5,370,963 | 12/1994 | Patet et al. | 430/137 |
| 5,370,964 | 12/1994 | Patel et al. | 430/137 |
| 5,391,456 | 2/1995 | Patel et al. | 430/137 |
| 5,403,693 | 4/1995 | Patel et al. | 430/137 |
| 5,405,728 | 4/1995 | Hopper et al. | 430/137 |
| 5,418,108 | 5/1995 | Kmiecik Lawrynowicz et al. | 430/137 |
| 5,501,935 | 3/1996 | Patel et al. | 430/137 |

*Primary Examiner*—Marion McCamish
*Assistant Examiner*—John J. Guarriello
*Attorney, Agent, or Firm*—E. O. Palazzo

[57] ABSTRACT

A process for the preparation of ink compositions comprising the emulsion polymerization of monomer, water, surfactant, and initiator with stirring and heating to provide a latex; mixing therewith a pigment dispersion of pigment particles, water, and cationic surfactant; blending the mixture; thereafter stirring the mixture; and subsequently adding additional anionic surfactant to stabilize the aggregate particles.

33 Claims, 1 Drawing Sheet

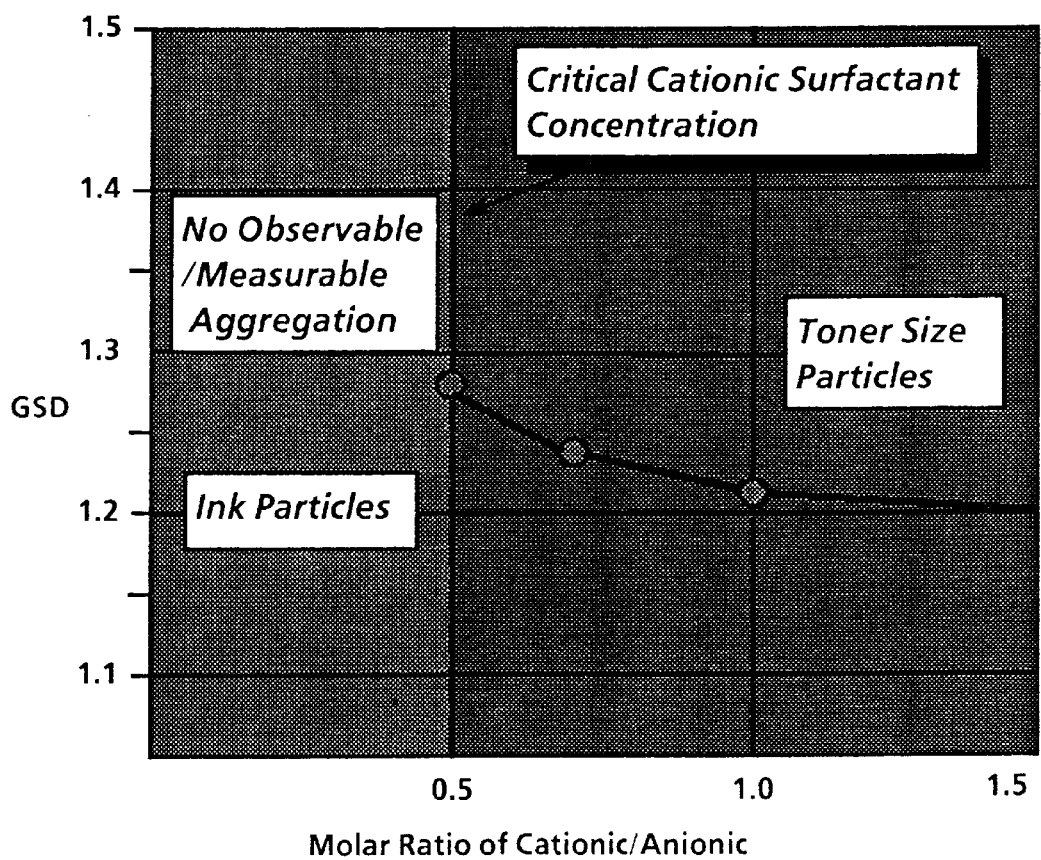

MODIFIED EMULSION AGGREGATION PROCESSES

BACKGROUND OF THE INVENTION

The present invention is generally directed to toner processes, and more specifically to the preparation of inks, including ink jet inks and thermal ink jet inks by modified in situ chemical emulsion aggregation processes as illustrated in the copending patent applications and patent mentioned herein, the disclosures of which are totally incorporated herein by reference, such as U.S. Pat. No. 5,364,729, wherein there are illustrated, for example, emulsion aggregation processes for the preparation of dry toners by (i) preparing a pigment dispersion, which dispersion is comprised of a pigment, an ionic surfactant, and optionally a charge control agent;

(ii) shearing said pigment dispersion with a latex or emulsion blend comprised of resin, a counterionic surfactant with a charge polarity of opposite sign to that of said ionic surfactant and a nonionic surfactant;

(iii) heating the above sheared blend below about the glass transition temperature (Tg) of the resin to form electrostatically bound toner size aggregates with a narrow particle size distribution; and (iv) heating said bound aggregates above about the Tg of the resin.

With the present invention the aforementioned steps of aggregation (iii) and coalescence (iv) can be eliminated. The inks of the present invention can be selected for a number of known ink jet printing methods and apparatus, including thermal ink jet or bubble jet processes as described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of which are totally incorporated herein by reference. The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction toward a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refined after 100 to 500 microseconds minimum dwell time to enable the channel to be refilled and to enable the dynamic refilling factors to become somewhat dampened.

Known ink jet inks generally comprise a water soluble dye which is soluble in an ink vehicle such as water or a mixture comprising water and a water soluble or water miscible organic solvent. Inks comprising soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. These and other disadvantages are avoided or minimized with the present invention.

There is illustrated in U.S. Pat. No. 4,996,127 a dry toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. Also, see column 9, lines 50 to 55, wherein a polar monomer, such as acrylic acid, in the emulsion resin is necessary, and toner preparation is not obtained without the use, for example, of acrylic acid polar group, see Comparative Example I. In U.S. Pat. No. 4,983,488, there is disclosed a process for the preparation of dry toners by the polymerization of a polymerizable monomer dispersed by emulsification in the presence of a colorant and/or a magnetic powder to prepare a principal resin component, and then effecting coagulation of the resulting polymerization liquid in such a manner that the particles in the liquid after coagulation have diameters suitable for a toner. It is indicated in column 9 of this patent that coagulated particles of 1 to 100 and particularly 3 to 70 microns are obtained. This process is thus directed to the use of coagulants, such as inorganic magnesium sulfate, which results in the formation of particles with a wide GSD. In U.S. Pat. No. 4,797,339, there is disclosed a process for the preparation of dry toners by resin emulsion polymerization, wherein similar to the '127 patent certain polar resins are selected.

Examples of Xerox Corporation copending patent applications and patents that relate to emulsion/aggregation processes for the preparation of toners include:

In U.S. Pat. No. 5,290,654, the disclosure of which is totally incorporated herein by reference, there is illustrated a process for the preparation of toners comprised of dispersing a polymer solution comprised of an organic solvent and a polyester, and homogenizing and heating the mixture to remove the solvent and thereby forming toner composites; in U.S. Pat. No. 5,278,020, the disclosure of which is totally incorporated herein by reference, there is illustrated the preparation of a latex emulsion by agitating in water a mixture of a nonionic surfactant, an anionic surfactant, a first nonpolar olefinic monomer, a second nonpolar diolefinic monomer, a free radical initiator and a chain transfer agent; and polymerizing the latex emulsion mixture by heating from ambient temperature to about 80° C. to form nonpolar olefinic emulsion resin particles of volume average diameter of from about 5 nanometers to about 500 nanometers; in U.S. Pat. No. 5,308,734, the disclosure of which is totally incorporated herein by reference, there is illustrated a process for the preparation of toner compositions which comprises generating an aqueous dispersion of toner fines, ionic surfactant and nonionic surfactant, adding thereto a counterionic surfactant with a polarity opposite to that of said ionic surfactant, homogenizing and stirring said mixture, and heating to provide for coalescence of said toner fine particles; and other emulsion/aggregation toner processes are illustrated in U.S. Pat. No. 5,346,797, and U.S. Pat. No. 5,370,963, the disclosures of which are totally incorporated herein by reference.

SUMMARY OF THE INVENTION

It is an object of the present invention to provide ink jet ink processes with many of the advantages illustrated herein.

In another object of the present invention there are provided simple and economical processes for the direct preparation of black and colored ink jet ink compositions.

Another object of the present invention is to provide ink compositions with acceptable thermal and storage stability, and ink compositions suitable for ink jet printing, which inks do not induce, or minimize clogging of the ink printheads and wherein the inks possess excellent smear resistance, improved jetting characteristics, excellent waterfastness, no intercolor bleeding, fast drying, lightfastness to the extent, for example, that the developed images are substantially permanent, and improved print quality as compared to conventional dye based inks.

These and other objects of the present invention are accomplished in embodiments by the provision of ink compositions, which comprise an aqueous liquid vehicle, and pigments, and which inks are generated by emulsion processes. More specifically the process of the present invention comprises the blending of an anionic latex with a pigment solution containing a cationic surfactant such as alkylbenzyldimethyl ammonium chloride, available as SANIZOL B™, while being homogenized, and wherein the amount of cationic surfactant is equal to or less than about 0.5 mole to mole ratio of the anionic surfactant to, for example, permit some aggregation of particles, and wherein such aggregation is not to the extent as in the emulsion/aggregation processes illustrated in the copending applications and patent mentioned herein. The aggregation, although not measurable on the Coulter Counter, is conducted at room temperature. Illustrated in the Figure is a graph detailing the relationship between the molar ratio of the cationic/anionic surfactant versus the GSD (geometric size distribution) of the toner.

In embodiments, the present invention is directed to processes for the preparation of ink jet ink compositions, which comprise the emulsion polymerization of monomer, water, and surfactant initiator with stirring and heating; mixing therewith a pigment dispersion of pigment particles, water, and cationic surfactant; thereafter blending the resulting mixture prior to, after, or during the addition of anionic surfactant; and subsequently separating the formed ink jet pigmented composition of submicron particles. More specifically, the process of the present invention comprises the emulsion polymerization of monomer, water, and surfactant initiator with stirring and heating; mixing therewith a pigment dispersion of pigment particles, water, and cationic surfactant; blending the mixture; and thereafter stirring the mixture. The inks resulting can contain, for example, about 16.25 percent polymeric resin, about 2 to about 4 percent pigment, and 10 percent surfactant. The resin formed can be comprised of styrene butylacrylate/acrylic acid in the ratio of 82/18/2 pph, while the pigment mixture comprises pigment water and cationic surfactant. The amount of cationic surfactant should not exceed more than 0.5 mole to mole ratio of the anionic surfactant. The pigment mixture is stirred and then blended together with the anionic latex using a high speed blending device, such as a polytron, for an effective period of, for example, about 1 minute, and the particles obtained were in the size range of about 0.3 to about 1.5 microns, and preferably in the range of about 0.3 to about 0.8 micron in average volume diameter. The resultant particles can be jetted using, for example, a Hewlett Packard printer, such as the HP 550C printer. In embodiments, the present invention relates to a process for the preparation of ink compositions with controlled particle size comprising the emulsion polymerization of monomer, water, and an anionic surfactant initiator; and heating; mixing therewith a pigment dispersion of pigment particles, water, and cationic surfactant; and blending the resulting mixture; and wherein the mixture resulting is heated above or at the polymer glass transition temperature, and which heating enables the evaporation of water and the aggregation of the ink components. In embodiments, the present invention is directed to a process for the preparation of ink compositions comprising the emulsion polymerization of monomer, water, surfactant, and initiator with stirring and heating to provide a latex; mixing therewith a pigment dispersion of pigment particles, water, and cationic surfactant; blending the mixture; and thereafter stirring the mixture; and adding an effective amount of additional anionic surfactant during the process to stabilize the aggregate particles.

Illustrative examples of specific polymers, formed in the emulsion in the process of the present invention include known polymers such as poly(styrene-butadiene), poly(para-methyl styrene-butadiene), poly(meta-methyl styrene-butadiene), poly(alpha-methyl styrene-butadiene), poly(methylmethacrylate-butadiene), poly(ethylmethacrylate-butadiene), poly(propylmethacrylate-butadiene), poly(butylmethacrylate-butadiene), poly(methylacrylate-butadiene), poly(ethylacrylate-butadiene), poly(propylacrylate-butadiene), poly(butylacrylate-butadiene), poly(styrene-isoprene), poly(para-methyl styrene-isoprene), poly(meta-methyl styrene-isoprene), poly(alpha-methylstyrene-isoprene), poly(methylmethacrylate-isoprene), poly(ethylmethacrylate-isoprene), poly(propylmethacrylate-isoprene), poly(butylmethacrylate-isoprene), poly(methylacrylate-isoprene), poly(ethylacrylate-isoprene), poly(propylacrylate-isoprene), and poly(butylacrylate-isoprene); polymers such as poly(styrene-butadiene-acrylic acid), poly(styrene-butadiene-methacrylic acid), PLIOTONE™ available from Goodyear, polyethylene-terephthaiate, polypropylene-terephtha late, polybutylene-terephthalate, polypentylene-terephthalate, polyhexalene-terephthalate, polyheptadene-terephthalate, polyoctalene-terephthalate, POLYLITE™ (Reichhold Chemical Inc), PLASTHALL™ (Rohm & Hass), CYGAL™ (American Cyanamide), ARMCO™ (Armco Composites), CELANEX™ (Celanese Eng), RYNITE™ (DuPont), STYPOL™, and the like. The preferred polymer is styrene/butyl acrylate/acrylic acid, 82:18:2 parts per hundred. The polymer selected, which generally can be in embodiments styrene acrylates, styrene butadienes, styrene isoprenes, styrene methacrylates, or polyesters, is present in various effective amounts, such as from about 85 weight percent to about 98 weight percent of the particle, and can be of small average particle size, such as from about 0.01 micron to about 1 micron in average volume diameter as measured by the Brookhaven nanosize particle analyzer. Other sizes and effective amounts of resin particles may be selected in embodiments, for example copolymers of poly(styrene butylacrylate acrylic acid), or poly(styrene butadiene acrylic acid) or poly(styrene isoprene acrylic acid).

The polymer selected for the process of the present invention is preferably prepared from emulsion polymerization methods, and the monomers utilized in such processes include styrene, acrylates, methacrylates, butadiene, isoprene, and optionally acid or basic olefinic monomers, such as acrylic acid, methacrylic acid, acrylamide, methacrylamide, quaternary ammonium halide of dialkyl or trialkyl acrylamides or methacrylamide, vinylpyridine, vinylpyrrolidone, vinyl-N-methylpyridinium chloride, and the like. The presence of acid or basic groups is optional and such groups can be present in various amounts of from about 0.1 to about 10 percent by weight of the polymer resin. Known chain transfer agents, for example dodecanethiol, about 1 to about 10 percent, or carbon tetrabromide in effective amounts, such as from about 1 to about 10 percent, can also be selected when preparing the resin particles by emulsion polymerization. Other processes of obtaining resin particles of from, for example, about 0.01 micron to about 3 microns can be selected from polymer microsuspension process, such as disclosed in U.S. Pat. No. 3,674,736, the disclosure of which is totally incorporated herein by reference, polymer solution microsuspension process, such as disclosed in U.S. Pat. No. 5,290,654, the disclosure of which is totally incorporated herein by reference, mechanical grinding processes, or other known processes.

Various known colorants or pigments present in the ink in an effective amount of, for example, from about 1 to about 25 percent by weight and preferably in an amount of from about 1 to about 15 weight percent, that can be selected include carbon black like REGAL 330®, colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, SUNSPERSE™ and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. The pigments selected are present in various effective amounts, such as from about 1 weight percent to about 65 weight and preferably from about 2 to about 12 percent, of the toner.

Surfactants in amounts of, for example, 0.1 to about 25 weight percent in embodiments include, for example, nonionic surfactants such as dialkylphenoxypoly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. An effective concentration of the nonionic surfactant is in embodiments, for example from about 0.01 to about 10 percent by weight, and preferably from about 0.1 to about 5 percent by weight of monomers, used to prepare the copolymer resin.

Examples of ionic surfactants include anionic and cationic surfactants with examples of anionic surfactants being, for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, and the like. An effective concentration of the anionic surfactant generally employed is, for example, from about 0.01 to about 10 percent by weight, and preferably from about 0.1 to about 5 percent by weight of monomers used to prepare the copolymer resin particles of the emulsion or latex blend.

Examples of the cationic surfactants, which are usually positively charged, selected for the toners and processes of the present invention include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride) available from Kao Chemicals, and the like, and mixtures thereof. This surfactant is utilized in various effective amounts, such as for example from about 0.1 percent to about 5 percent by weight of water. Preferably, the molar ratio of the cationic surfactant used for flocculation to the anionic surfactant used in the latex preparation is in the range of from about 0.1 to 1.0, and preferably from 0.1 to 0.5.

Counterionic surfactants are comprised of either anionic or cationic surfactants as illustrated herein and in the amount indicated, thus, when the ionic surfactant of step (i) is an anionic surfactant, the counterionic surfactant is a cationic surfactant.

Examples of the anionic surfactant that are added to the emulsion and pigment mixture for stabilization, include sodium dodecylsulfate (SDS), sodium dodecylbenzene sulfonate, sodium dodecylnaphthalene sulfate, dialkyl benzenealkyl, sulfates and sulfonates, NEOGEN R™, NEOGEN SC™ obtained from Kao, and the like. An effective concentration of the anionic surfactant generally employed is, for example, from about 0.01 to about 20 percent by weight, and preferably from about 0.1 to about 10 percent by weight.

The liquid vehicle of the inks of the present invention can be comprised of various known components, such as water, a mixture of water and a miscible organic component, such as a glycol like ethylene glycols, propylene glycols, diethylene glycols, glycerines, dipropylene glycols, polyethylene glycols, polypropylene glycols, amides, ethers, carboxylic acids, esters, alcohols, organosulfides, organosulfoxides, sulfones, dimethylsulfoxides, sulfolanes, alcohol derivatives, carbitols, butyl carbitols, cellusolves, ether derivatives, amino alcohols, ketones; biocides; other water miscible materials, mixtures thereof; and the like. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally serves as a humectant which has a boiling point higher than that of water (100° C.). The ink liquid vehicle components, that is for example the water and the humectants, generally possess absorption characteristics on paper and evaporation properties allowing for the desired ink jet printing speed when the ink is to be used in an ink jet printing process. With the inks of the present invention in embodiments, the liquid vehicle can be present in an amount of from about 85 to about 99.5 percent by weight, and preferably from about 90 to about 99 percent by weight. Optional known additives can be present in the inks of the present invention as indicated herein, such as biocides like DOWICIL™ 150, 200, and 75, benzoate salts, sorbate salts, and the like, present in an effective amount of, for example, from about 0.0001 to about 4 percent by weight, and preferably from about 0.01 to about 2.0 percent by weight; humectants such as ethylene glycol, diethylene glycol, N-methylpyrrolidinone, propylene glycol, hydroxyethers, ethers, amnides, sulfoxides, ketones, lactones, esters, alcohols, and the like, present in an effective amount of, for example, from 0 to about 50 percent by weight, and preferably from about 5 to about 40 percent by weight; pH controlling agents such as acids or bases, phosphate salts, carboxylates salts, sulfite salts, amine salts, and the like, present in an amount of from 0 to about 1 percent by weight, and preferably from about 0.01 to about 1 percent by weight, or the like.

The ink compositions of the present invention are suitable for use in ink jet printing processes such as continuous stream, piezoelectric drop-on-demand, bubble jet or thermal ink jet processes. Generally, the process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the DIABLO C150 IJ™ printer, HEWLETT PACKARD DESK JET™ printers, the DIABLO C150 TIJ™ printer, or the like. Particularly preferred is a thermal ink jet printing apparatus. The inks of the present invention can be used to form images on a wide variety of substrates, including plain paper such as Xerox 4024® paper, bond paper such as GILBERT®, 25 percent cotton bond paper or GILBERT® 100 percent cotton bond paper, Sanyo Kokusaku FX-L paper available from Fuji Xerox, silica coated papers, transparency materials, fabrics, plastics, polymeric films, and the like.

An advantage of the present invention is that, while the extra anionic surfactant added prevent further growth of the submicron aggregate particles of step (iv), it would optionally allow future jets to operate at higher temperatures than currently employed.

The following Examples are being submitted to further define various species of the present invention. These Examples are intended to be illustrative only and are not intended to limit the scope of the present invention. Also, parts and percentages are by weight unless otherwise indicated.

EXAMPLE I

Emulsion Synthesis of Styrene-Butylacrylate-Acrylic Acid (Latex A):

A polymeric or emulsion latex was prepared by the emulsion polymerization of styrene/butylacrylate/acrylic acid (88/12/2 parts) in a nonionic/anionic surfactant solution (3 percent) as follows. 352 Grams of styrene, 48 grams of butyl acrylate, 8 grams of acrylic acid, and 12 grams (3 percent) of dodecanethiol were mixed with 600 milliliters of deionized water in which 9 grams of sodium dodecyl benzene sulfonate anionic surfactant (NEOGEN R™ which contains 60 percent of active component), 8.6 grams of polyoxyethylene nonyl phenyl ether—non ionic surfactant (ANTAROX 897™—70 percent active), and 4 grams of ammonium persulfate initiator were dissolved. The emulsion was then polymerized at 70° C. for 6 hours. The resulting latex, 60 percent water and 40 percent (weight percent throughout) solids, was comprised of a copolymer of polystyrene/polybutyl acrylate/polyacrylic acid, 88/12/2; the Tg of the latex dry sample was 60° C., as measured on a DuPont DSC; $M_w$=22,500, and $M_n$=5,000 as determined on the Hewlett Packard GPC. The zeta potential as measured on Pen Kem Inc. Laser Zee Meter was −95 millivolts for this polymeric latex. The particle size of the latex as measured on Brookhaven BI-90 Particle Nanosizer was 136 nanometers.

PREPARATION OF INK PARTICLES—CYAN:

25 Grams of BHD 6000 (53 percent solids) SUNSPERSE BLUE™ pigment were dispersed in 150 milliliters of deionized water containing 0.7 gram of alkylbenzyldimethyl ammonium chloride cationic surfactant (SANIZOL B™) by stirring. This cationic dispersion of the pigment was then simultaneously added with 260 grams of the above prepared Latex A (40 percent solids) containing 2.3 grams of anionic surfactant and 230 grams of water while being homogenized with an IKA G45M probe for 1 minute at 5,000 rpm. This mixture then was transferred into a reaction kettle and stirred for 10 minutes using an ordinary stirrer. A sample thereafter was measured on the Coulter Counter indicating particles under 1 micron. These particles were also observed under an optical miscroscope for reconfirmation. 30 Milliliters of 20 percent (W/W) anionic surfactant solution were added to the aggregates to prevent any further growth. The resulting cyan ink was comprised of 16.25 percent resin of poly(styrene-co-butylacrylate-co-acrylic acid), and 2.0 percent of SUNFAST BLUE™ pigment.

PREPARATION OF INK PARTICLES—MAGENTA:

34 Grams of QHD 6040 (39 percent solids) SUNSPERSE BLUE™ pigment were dispersed in 150 milliliters of deionized water containing 0.7 gram of alkylbenzyldimethyl ammonium chloride cationic surfactant (SANIZOL B™) by stirring. This cationic dispersion of the pigment was then simultaneously added with 260 grams of Latex A (40 percent solids) containing 2.3 grams of anionic surfactant to 230 grams of water while being homogenized with an IKA G45M probe for 1 minute at 5,000 rpm. This mixture then was transferred into a reaction kettle and stirred for 10 minutes using an ordinary stirrer. A small sample thereafter was measured on the Coulter Counter indicating submicron particles. These particles were also observed under an optical miscroscope for reconfirmation of their size. 30 Milliliters of 20 percent (W/W) anionic surfactant solution were added to the aggregates to prevent any further growth. The resulting cyan ink was comprised of 16.25 percent resin of poly(styrene-co-butylacrylate-co-acrylic acid), and 2.0 percent of SUNFAST MAGENTA™ pigment.

PREPARATION OF INK PARTICLES—YELLOW:

50 Grams of YHD 9439 (33 percent solids) SUNSPERSE YELLOW™ pigment were dispersed in 150 milliliters of deionized water containing 0.9 gram of alkylbenzyldimethyl ammonium chloride cationic surfactant (SANIZOL B™) by stirring. This cationic dispersion of the pigment was then simultaneously added with 260 grams of Latex A (40 percent solids) containing 2.3 grams of anionic surfactant to 230 grams of water while being homogenized with an IKA G45M probe for 1 minute at 5,000 rpm. The resulting mixture then was transferred into a reaction kettle and stirred for 10 minutes using an ordinary stirrer. A sample thereafter was measured on the Coulter Counter indicating submicron particles. These particles were also observed under an optical miscroscope for reconfirmation of their size. 30 Milliliters of 20 percent (W/W) anionic surfactant solution were added to the ink aggregates formed to prevent any further growth. The resulting cyan ink was comprised of 16.25 percent resin of poly(styrene-co-butylacrylate-co-acrylic acid), and 2.5 percent of SUNFAST YELLOW™ pigment.

PREPARATION OF INK PARTICLES—BLACK:

52 Grams of LHD 9303 (49 percent Solids) SUNSPERSE BLACK™ pigment were dispersed in 150 milliliters of deionized water containing 0.9 gram of alkylbenzyldimethyl ammonium chloride cationic surfactant (SANIZOL B™) by stirring. This cationic dispersion of the pigment was than simultaneously added with 260 grams of Latex A (40 percent solids) containing 2.3 grams of anionic surfactant to 230 grams of water while being homogenized with an IKA G45M probe for 1 minutes at 5,000 rpm. This mixture then was transferred into a reaction kettle and stirred for 10 minutes using an ordinary stirrer. A sample thereafter was measured on the Coulter Counter indicating submicron particles. These particles were also observed under an optical miscroscope for reconfirmation of their size. 30 Milliliters of 20 percent (W/W) anionic surfactant solution were added to the aggregates to prevent any further growth. The resulting cyan ink was comprised of 16.25 percent resin of poly(styrene-co-butylacrylate-co-acrylic acid), and 4.0 percent of SUNFAST BLACK™ pigment.

Other modifications of the present invention may occur to those skilled in the art subsequent to a review of the present application and these modifications, including equivalents thereof, are intended to be included within the scope of the present invention.

What is claimed is:

1. A process for the preparation of ink compositions consisting essentially of in the following order the emulsion polymerization of monomer, water, surfactant, and initiator with stirring and heating to provide a latex; mixing therewith a pigment dispersion of pigment particles, water, and cationic surfactant; blending the mixture; thereafter stirring the mixture; and subsequently adding anionic surfactant to stabilize the aggregate particles, and wherein said cationic surfactant is selected in an amount of from about 0.1 weight percent to about 0.75 weight percent, and wherein said ink compositions contain a polymer formed by the emulsion polymerization of said monomer and pigment.

2. A process in accordance with claim 1 wherein in the emulsion polymerization of monomer, water and surfactant, said surfactant is an ionic surfactant, and wherein said ionic surfactant stabilizes said ink compositions.

3. A process in accordance with claim 1 wherein the formed particles are of a size diameter of from about 0.005 to about 1 micron.

4. A process in accordance with claim 1 wherein the cationic surfactant is present in an amount of 0.5 weight percent.

5. A process in accordance with claim 1 wherein the surfactant utilized in preparing the pigment dispersion is a cationic surfactant, and the surfactant present in the latex mixture is an anionic surfactant.

6. A process in accordance with claim 1 wherein the surfactant utilized in preparing the pigment dispersion is an anionic surfactant, and the surfactant present in the latex mixture is a cationic surfactant.

7. A process in accordance with claim 1 wherein the dispersion is accomplished by homogenizing at from about 1,000 revolutions per minute to about 10,000 revolutions per minute, at a temperature of from about 20° C. to about 35° C., and for a duration of from about 1 minute to about 120 minutes.

8. A process in accordance with claim 1 wherein the dispersion is accomplished by an ultrasonic probe at from about 300 watts to about 900 watts of energy, at from about 5 to about 50 megahertz of amplitude, at a temperature of from about 25° C. to about 55° C., and for a duration of from about 1 minute to about 120 minutes.

9. A process in accordance with claim 1 wherein the dispersion is accomplished by microfluidization in a microfluidizer, or in nanojet for a duration of from about 1 minute to about 120 minutes.

10. A process in accordance with claim 1 wherein the blending is accomplished by homogenizing at from about 1,000 revolutions per minute to about 10,000 revolutions per minute for a duration of from about 1 minute to about 120 minutes.

11. A process in accordance with claim 1 wherein the polymer formed from said monomer is selected from the group consisting of poly(styrene-butadiene), poly(para-methyl styrene-butadiene), poly(meta-methylstyrene-butadiene), poly(alpha-methylstyrene-butadiene), poly(methylmethacrylate-butadiene), poly(ethylmethacrylate-butadiene), poly(propylmethacrylate-butadiene), poly(butylmethacrylate-butadiene), poly(methylacrylate-butadiene), poly(ethylacrylate-butadiene), poly(propylacrylate-butadiene), poly(butylacrylate-butadiene), poly(styrene-isoprene), poly(para-methyl styrene-isoprene), poly(meta-methylstyrene-isoprene), poly(alpha-methylstyrene-isoprene), poly(methylmethacrylate-isoprene), poly(ethylmethacrylate-isoprene), poly(propylmethacrylate-isoprene), poly(butylmethacrylate-isoprene), poly(methylacrylate-isoprene), poly(ethylacrylate-isoprene), poly(propylacrylate-isoprene), and poly(butylacrylate-isoprene).

12. A process in accordance with claim 1 wherein the polymer formed from said monomer is styrene/butylacrylate/acrylic acid.

13. A process in accordance with claim 1 wherein the polymer formed from said monomer is styrene/butylacrylate/acrylic acid.

14. A process in accordance with claim 1 wherein the polymer formed from said monomer is styrene/butylacrylate/acrylic acid 82:18:2.

15. A process in accordance with claim 1 wherein the polymer formed from said monomer is styrene/butylacrylate/acrylic acid 82:18:2.

16. A process in accordance with claim 1 wherein in the emulsion polymerization of monomer, water, surfactant, and initiator, said surfactant is a nonionic surfactant selected from the group consisting of polyvinyl alcohol, methalose, methyl cellulose, ethyl cellulose, propyl cellulose, hydroxy ethyl cellulose, carboxy methyl cellulose, polyoxyethylons cetyl ether, polyoxyethylens lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, and dialkylphenoxy poly(ethyleneoxy)ethanol.

17. A process in accordance with claim 1 wherein the anionic surfactant is selected from the group consisting of sodium dodecyl sulfate, sodium dodecylbenzene sulfate, and sodium dodecyinaphthalene sulfate.

18. A process in accordance with claim 1 wherein the cationic surfactant is a quaternary ammonium salt.

19. A process in accordance with claim 1 wherein the pigment is carbon black, cyan, yellow, magenta, or mixtures thereof.

20. A process in accordance with claim 1 wherein the surfactant for said emulsion polymerization is a nonionic surfactant concentration is from about 0.1 to about 5 weight percent; the anionic surfactant concentration is about 0.1 to about 5 weight percent; and the cationic surfactant concentration is about 0.4 to about 0.6 weight.

21. A process in accordance with claim 1 wherein the latex in an amount of from about 10 to about 25 weight percent is mixed with the pigment dispersion of pigment particles, and which dispersion is selected in an amount of from about 1 to about 10 weight percent, water, and cationic surfactant in the range of 0.1 to 0.75 weight percent; blending the mixture resulting for a period of 1 to 30 minutes; thereafter stirring the mixture at a speed in the range of 100 to 300 rpm for a period of 5 to 30 minutes; and subsequently adding said additional anionic surfactant in the range of 2 to 10 percent to stabilize the aggregate particles.

22. A process in accordance with claim 1 further comprising adding to the formed ink a humectant in the amount of from about 2 to about 50 percent by weight, or a biocide present in the amount of from about 0.02 to about 0.1 percent by weight.

23. A printing process which comprises (1) incorporating into an ink jet printing apparatus the ink composition obtained by the process of claim 1, and (2) causing droplets of the ink to be ejected in an imagewise pattern onto a substrate, thereby generating images on the substrate.

24. A printing process in accordance with claim 23 wherein the ink jet printing apparatus employs a thermal ink jet printing process.

25. A printing process in accordance with claim 23 wherein there are provided prints on paper with solid area coverage having an optical density of from about 0.001 to about 0.05, and a waterfastness of from about 80 percent to about 99 percent.

26. A process in accordance with claim 23 wherein said mixture upon jetting is heated above or at the polymer glass transition, which heating enables the evaporation of water and thereby increases said additional anionic surfactant concentration, thereby enabling the further aggregation of the ink particles on the substrate and enhancing the optical density of the image.

27. A process in accordance with claim 1 wherein the emulsion polymerization surfactant and the cationic surfactant are comprised of similar components.

28. A process in accordance with claim 1 wherein the mixture resulting said additional anionic surfactant is heated above or at the polymer glass transition temperature.

29. A process in accordance with claim 1 wherein the ink particles formed are submicron in size.

30. A process for the preparation of ink compositions consisting of accomplishing in the following order the emulsion polymerization of monomer, water, surfactant, and initiator with stirring and heating to provide a latex; mixing therewith a pigment dispersion of pigment particles, water, and cationic surfactant, blending the mixture; thereafter stirring the mixture; and subsequently adding anionic surfactant to stabilize the aggregate particles, and wherein the molar ratio of cationic surfactant to anionic surfactant is from 0.5 to 1.5, and wherein the latex in an amount of from about 10 to about 25 weight percent is mixed with the pigment dispersion of pigment particles, and which dispersion is selected in an amount of from about 1 to about 10 weight percent, water, and cationic surfactant; blending the mixture resulting for a period of 1 to 30 minutes; thereafter stirring the mixture at a speed in the range of 100 to 300 rpm for a period of 5 to 30 minutes; and subsequently adding extra anionic surfactant in the range of 2 to 10 percent to stabilize the aggregate particles.

31. A process in accordance with claim 30 wherein the amount of cationic surfactant is equal to about 0.5 mol to the mol ratio of the anionic surfactant.

32. A process for the preparation of ink compositions consisting essentially of accomplishing in the following order the emulsion polymerization of monomer, water, surfactant, and initiator with stirring and heating to provide a latex; mixing therewith a pigment dispersion of pigment particles, water, and cationic surfactant; blending the mixture; thereafter stirring the mixture; and subsequently adding anionic surfactant to stabilize the aggregate particles, and wherein the molar ratio of cationic to anionic surfactant is from 0.5 to 1.5, and wherein said ink compositions contain a polymer and pigment.

33. A process for the preparation of ink compositions consisting of in the following order the emulsion polymerization of monomer, water, surfactant, and initiator with stirring and heating to provide a latex; mixing therewith a pigment dispersion of pigment particles, water, and cationic surfactant; blending the mixture; thereafter stirring the mixture; and subsequently adding additional anionic surfactant to stabilize the aggregate particles, and wherein said cationic surfactant is selected in an amount of from about 0.1 weight percent to about 0.75 weight percent, and wherein said ink compositions contain a polymer and pigment.

* * * * *